(12) United States Patent
Said et al.

(10) Patent No.: US 11,159,368 B2
(45) Date of Patent: Oct. 26, 2021

(54) COMPONENT INTEGRATION

(71) Applicant: SAP SE, Walldorf (DE)

(72) Inventors: Bare Said, Sankt Leon Rot (DE);
Tobias Hoehmann, Heidelberg (DE);
Viktor Kehayov, Walldorf (DE);
Michael Saupe, Walldorf (DE); Dennis Koerner, Karlsdorf-Neuthard (DE);
Andreas Linke, Rauenberg (DE);
Dariusz Bil, Walldorf (DE); Jan Teichmann, Neustadt/Weinstrasse (DE)

(73) Assignee: SAP SE, Walldorf (DE)

( * ) Notice: Subject to any disclaimer, the term of this patent is extended or adjusted under 35 U.S.C. 154(b) by 74 days.

(21) Appl. No.: 16/221,883

(22) Filed: Dec. 17, 2018

(65) Prior Publication Data
US 2020/0195498 A1    Jun. 18, 2020

(51) Int. Cl.
| | |
|---|---|
| *G06F 15/177* | (2006.01) |
| *H04L 12/24* | (2006.01) |
| *H04L 29/08* | (2006.01) |
| *H04L 12/26* | (2006.01) |

(52) U.S. Cl.
CPC .......... *H04L 41/0806* (2013.01); *H04L 41/02* (2013.01); *H04L 41/14* (2013.01); *H04L 43/12* (2013.01); *H04L 67/10* (2013.01)

(58) Field of Classification Search
CPC ..... H04L 41/0806; H04L 41/02; H04L 41/14; H04L 43/12; H04L 67/10
USPC ................. 709/220–221, 223–224
See application file for complete search history.

(56) References Cited

U.S. PATENT DOCUMENTS

| | | | | |
|---|---|---|---|---|
| 7,145,898 B1* | 12/2006 | Elliott | ............. | H04L 12/66 370/352 |
| 8,736,299 B1* | 5/2014 | Pedersen | ............. | G06F 21/76 326/8 |
| 2007/0226795 A1* | 9/2007 | Conti | ............. | G06F 21/554 726/22 |
| 2007/0288208 A1* | 12/2007 | Grigsby | ............. | G06Q 10/06 703/2 |
| 2008/0140822 A1* | 6/2008 | Torii | ............. | H04W 4/50 709/223 |
| 2009/0049220 A1* | 2/2009 | Conti | ............. | G06F 13/24 710/267 |
| 2009/0287837 A1* | 11/2009 | Felsher | ............. | G06Q 20/367 709/229 |
| 2010/0317420 A1* | 12/2010 | Hoffberg | ............. | G07F 17/323 463/1 |
| 2011/0161419 A1* | 6/2011 | Chunilal | ............. | H04L 51/14 709/204 |
| 2013/0159021 A1* | 6/2013 | Felsher | ............. | G16H 10/60 705/3 |

(Continued)

*Primary Examiner* — Thu Ha T Nguyen
(74) *Attorney, Agent, or Firm* — Mintz Levin Cohn Ferris Glovsky and Popeo, P.C.

(57) ABSTRACT

A system, a method, and a computer program product for performing component integration. A first computing system generates a computing component for integration with a second computing system. The first computing system provides the computing component to the second computing system. The second computing system configures the computing component for operation by the first computing system with at least one computing component of the second computing system. The first computing system operates the configured computing component in the second computing system.

18 Claims, 7 Drawing Sheets

(56) References Cited

U.S. PATENT DOCUMENTS

| | | | | |
|---|---|---|---|---|
| 2013/0232245 A1* | 9/2013 | Antosz | ................ | H04L 41/5054 |
| | | | | 709/222 |
| 2013/0304616 A1* | 11/2013 | Raleigh | .................. | G06Q 40/12 |
| | | | | 705/34 |
| 2015/0363481 A1* | 12/2015 | Haynes | .................. | G06Q 10/10 |
| | | | | 707/748 |
| 2016/0027076 A1* | 1/2016 | Jackson | ................ | H04L 65/403 |
| | | | | 709/217 |
| 2016/0080287 A1* | 3/2016 | Mogul | ................ | G06F 9/45541 |
| | | | | 709/225 |
| 2016/0210427 A1* | 7/2016 | Mynhier | ................ | G16H 50/20 |
| 2016/0210578 A1* | 7/2016 | Raleigh | ................ | H04M 15/88 |
| 2016/0328522 A1* | 11/2016 | Howley | ................ | G16H 10/60 |
| 2018/0218619 A1* | 8/2018 | Brown | ................ | G08G 5/0034 |
| 2018/0367363 A1* | 12/2018 | Jaeger | ................ | H04L 41/0803 |
| 2020/0014730 A1* | 1/2020 | Luotojarvi | ............ | H04L 43/065 |
| 2021/0042635 A1* | 2/2021 | Li | ......................... | G06F 16/367 |
| 2021/0065120 A1* | 3/2021 | De Munck | ........... | G06Q 10/105 |
| 2021/0067591 A1* | 3/2021 | Ly | ........................... | H04W 4/70 |

\* cited by examiner

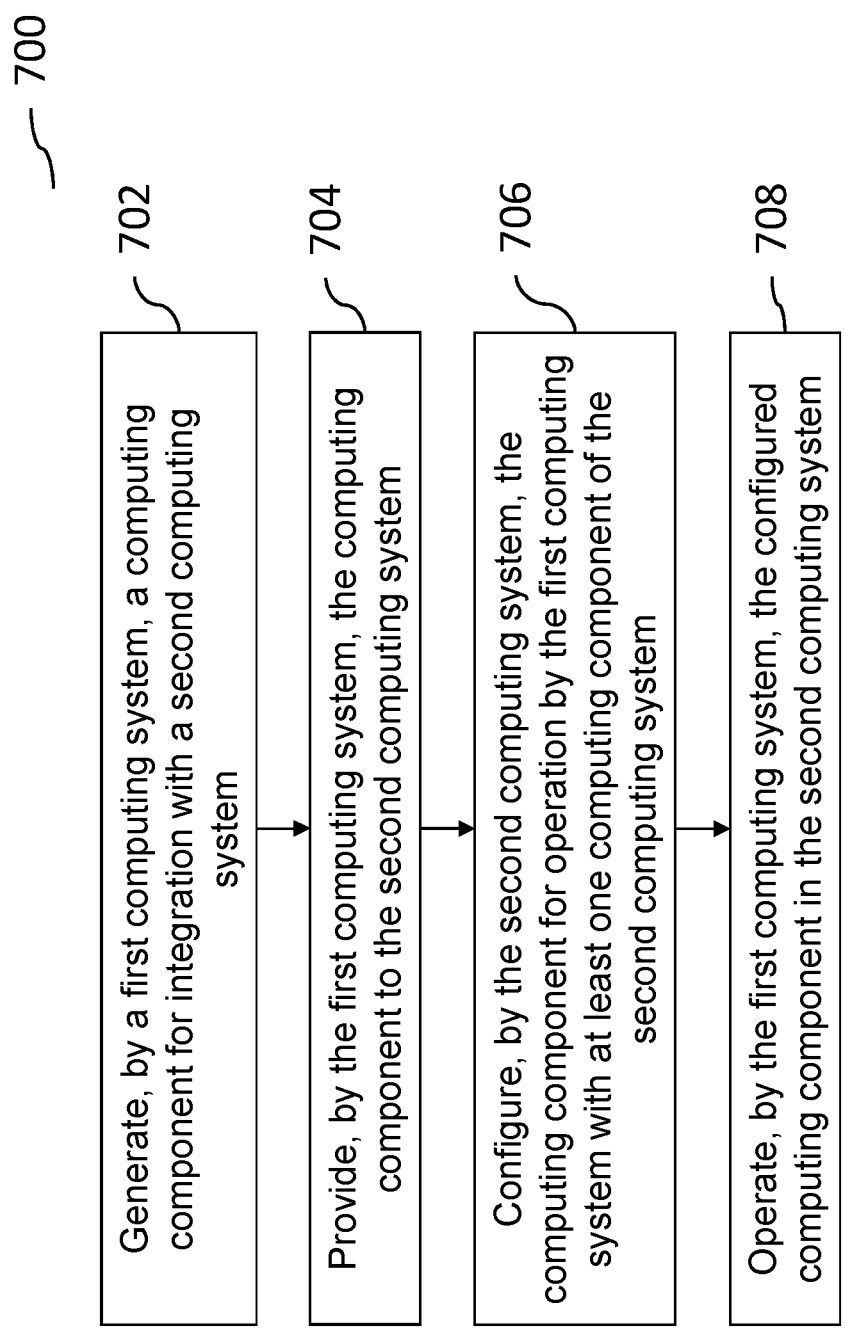

COMPONENT INTEGRATION

TECHNICAL FIELD

This disclosure relates generally to data processing and, in particular, to integration of components in various computing systems.

BACKGROUND

Many companies rely on software systems, components, applications, etc. as well as corresponding hardware components in conducting their daily activities. Examples of such software systems include email, word processing applications, internet browsing applications, financial software applications, sales applications, and/or many other types of software systems. Software is typically used by individuals to perform a variety of tasks and can involve vast amounts of data being generated, exchanged, manipulated, stored, etc. Proper coordination, integration among different software systems is important to continued operation of various processes, applications, etc.

SUMMARY

In some implementations, the current subject matter relates to a computer-implemented for performing component integration. The method may include generating, by a first computing system, a computing component for integration with a second computing system, providing, by the first computing system, the computing component to the second computing system, configuring, by the second computing system, the computing component for operation by the first computing system with at least one computing component of the second computing system, and operating, by the first computing system, the configured computing component in the second computing system In some implementations, the current subject matter may include one or more of the following optional features. The method may include monitoring, by the first computing system, operation of the configured computing component in the second computing system.

In some implementations, the configured computing component may include a software application, a hardware component, and any combination thereof. At least one of the first computing system and the second computing system is a cloud computing system.

In some implementations, the second computing system may provide at least one application programming interface for execution of at least one management process of the configured computing component and the at least one computing component of the second computing system. The management process may include at least one of the following: component provisioning, user management, configuration update, component de-provisioning, component off-boarding, expiration of the component, monitoring of the component de-provisioning, and any combination thereof.

In some implementations, the method may include embedding at least one user interface of the second computing system into at least one user interface of the first computing system associated with the configured computing component.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to component integration, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 illustrates an exemplary method, according to some implementations of the current subject matter.

When practical, similar reference numbers denote similar structures, features, or elements.

DETAILED DESCRIPTION

One or more implementations of the current subject matter relate to methods, systems, articles of manufacture, and the like that may, among other possible advantages, provide an ability to seamlessly integrate various computing components, e.g., hardware, software, and/or both, of one system with another computing system.

Figure 1:
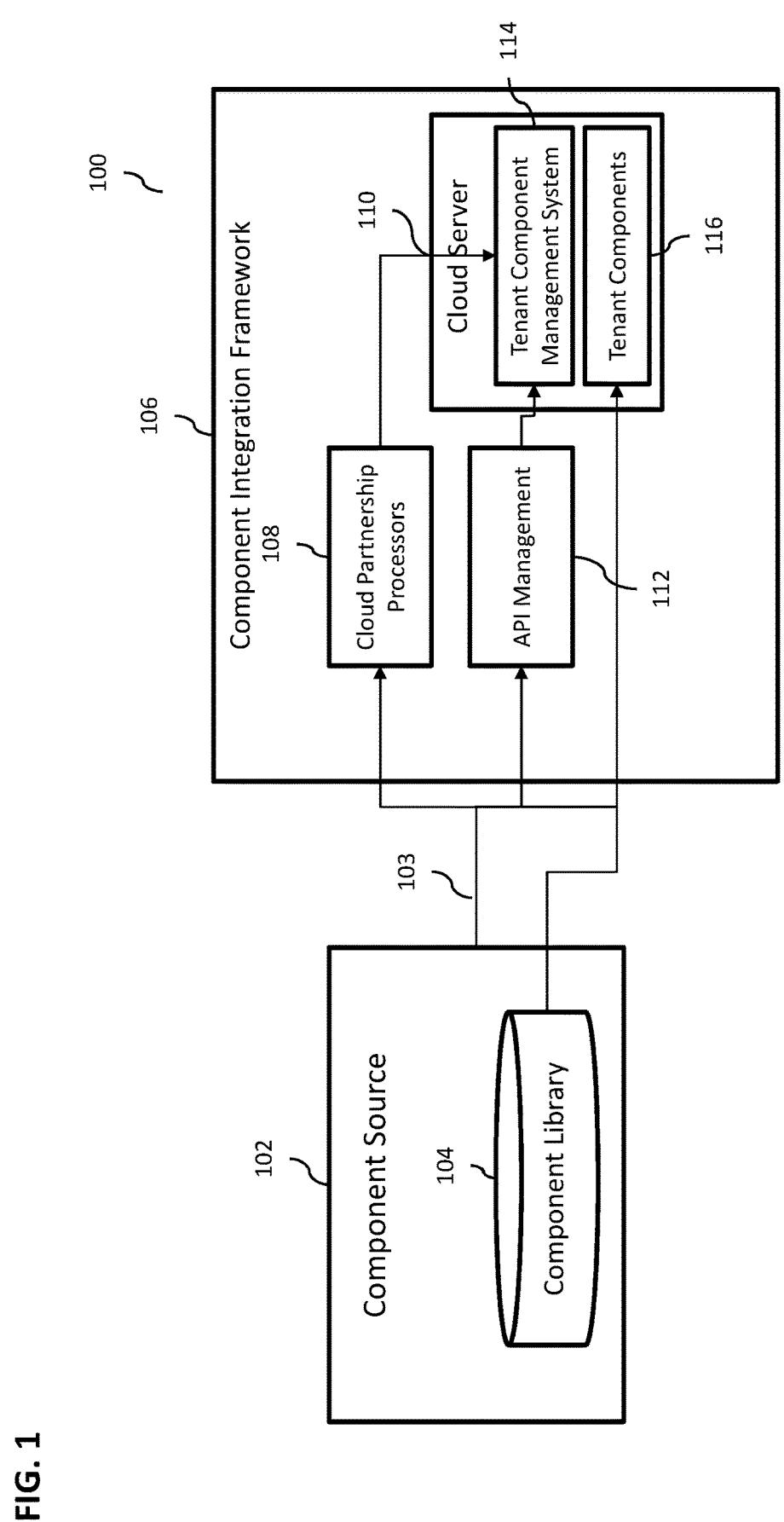
FIG. 1 illustrates an exemplary component integration system, according to some implementations of the current subject matter.

FIG. 1 illustrates an exemplary component integration system 100, according to some implementations of the current subject matter. A component may be any type of hardware, software, and/or any combination of both. A component may further include entire computing systems that may have its own component libraries, user interface elements, deployment parameters and/or systems, lifecycles, operation and support processes, etc. For ease of discussion, the following description will refer to component integration.

In some exemplary implementations, the current subject matter may provide seamless integration of cloud computing systems and/or any combination of their components, such as SAP Analytics Cloud (as available from SAP SE, Waldorf, Germany) into a third party computing system and/or cloud computing system. A third party computing system may be an original equipment manufacturer's (OEM) product, e.g., a software, a hardware, and/or any combination thereof system product(s). The OEM product may include a cloud computing system. Each of the SAP Analytics Cloud system and the OEM product may have their own processes, requirements, deployment parameters, lifecycles, operations, etc. The current subject matter may coordinate such processes, requirements, etc. to ensure proper integration of the cloud system into an OEM product.

Referring back to FIG. 1, the system 100 may include a component source 102 having a component library 104, and a component integration framework 106. The component source and the component integration framework may be communicatively coupled using any type of communication connection 103, which may include, but is not limited to, wired, wireless, and/or a combination of both network(s). The networks may include various local area networks (LAN), wide area networks (WAN), metropolitan area networks (MAN), virtual private networks (VPN), virtual local area networks (VLAN), and/or any combination thereof.

The component source 102 may be any type of original manufacturer of computing systems, computing components, software, hardware, cloud computing systems, etc., and/or any combination thereof. The component library 104 may include a catalog of such computing systems, components, etc. and may, alternatively, develop various computing systems, components, etc., as for example may be requested by a particular user.

The communication connection 103 may provide requisite communication capabilities between the component source 102 and the component integration framework 106. In some exemplary implementations, the communication connection 103 may serve to transmit the requirements, instructions, user interface components, application program interface (API) components, etc. to the component integration framework to ensure proper operational integration.

The component integration framework 106 may include one or more servers, processors, memory locations, cloud computing components/systems, etc. that may be used during integration of the components. The component integration framework 104 may include a cloud server component 110, a cloud partnership processor(s) 108, and application programming interface management component 112. The cloud server component 110 may include a tenant component management system 114, and a tenant components 116. The component source 102 may communicate, via the connection 103, with the cloud server component 110, and in particular, the tenant components 116, to provide operational integration parameters of the components from the component library 104. Additionally, the component library 104 may provide various user interface embedding requirements to the tenants components 116. The operation integration parameters may also be provided to the API management 112 as well as cloud partnership processors 108. Upon processing of the parameters, the API management 112 and the cloud partnership processors 108 may communicate with the tenant component management system 114 to ensure integration of the components from the library 104.

Figure 2:
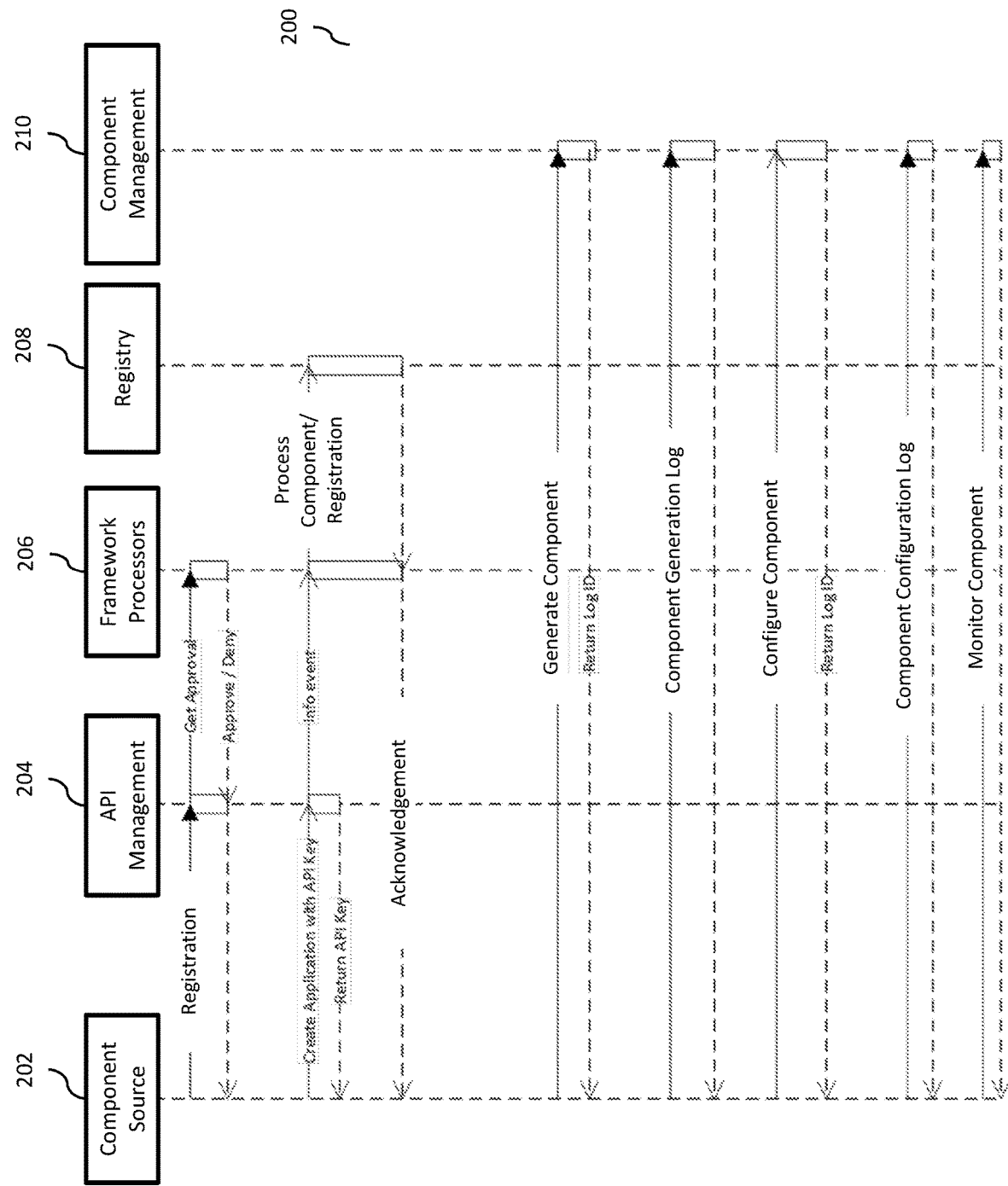
FIG. 2 illustrates an exemplary process for integration of components, according to some implementations of the current subject matter.

FIG. 2 illustrates an exemplary process 200 for integration of components (e.g., originating from an OEM), according to some implementations of the current subject matter. As shown in FIG. 2, an OEM 202 may have a component source (e.g., a component library 104 shown in FIG. 1) may initiate a registration action via an API management system 204 (e.g., API management 112 as shown in FIG. 1) of a component integration framework to ensure that integration of its components can take place. The registration request from the OEM source 202 may be approved or denied by framework's processor(s) 206.

If registration is approved, the OEM source 202 may create an application with an API key and provide it for registration with framework's registry 208. This may ensure that any component that is to be integrated is properly registered with the framework (e.g., framework 106 as shown in FIG. 1). Upon completion of a registration, the framework may transmit an acknowledgement to the OEM source 202.

After receiving the acknowledgement, the OEM source 202 may generate an appropriate component for the purposes of integration. As stated above, the generated component may be a software, a hardware, and/or any combination of both. It may include a computing system, a software application, a cloud computing system, etc., and/or any combination thereof. The OEM source 202 may already have the component for integration readily available. For example, the component may be part of the OEM source 202 library (e.g., component library 104 as shown in FIG. 1).

The OEM source 202 may transmit the request for a component and later a request to read its component generation log/configuration log to component management 210 of the integration framework. Additionally, the OEM source 202 may also transmit configuration parameters, data, metadata, etc. along with component configuration log to the component management 210 of the integration framework. This information may be used to ensure that the OEM source's component is properly configured and/or integrated with the framework and vice versa.

Once the generated component is integrated with the integration framework, the OEM source 202 may perform monitoring of the component's operation. The framework may also periodically transmit to the OEM source 202 information relating to operation of the component, e.g., error logs, operational parameters, etc. This information may be used to update the component, replace the component with a new component, etc.

As stated above, some exemplary, non-limiting implementations of the current subject matter may include use of SAP Analytics Cloud (SAC) that may perform various analytics, including intelligence, planning, and predictive processes. The current subject matter may provide an OEM computing component integration and management of OEM embedded/integrated OEM computing components, e.g., internal and/or external cloud OEM components may execute its own components (e.g., cloud-based computing components) within the SAP's cloud analytics platform, which may include compliance/conformance with any functional requirements, operational capabilities, etc. of each party.

In some implementations, OEM components may be configured to execute their own applications, infrastructures, operations processes etc. The current subject matter may provide a seamless integration of such execution so that an end-user is not burdened by different deployment infrastructures coming from various vendors. The current subject matter may also provide a high degree of alignment, technical compatibility and synchronization of the OEM component with any existing system (e.g., integration framework 106 shown in FIG. 1).

Figure 3:
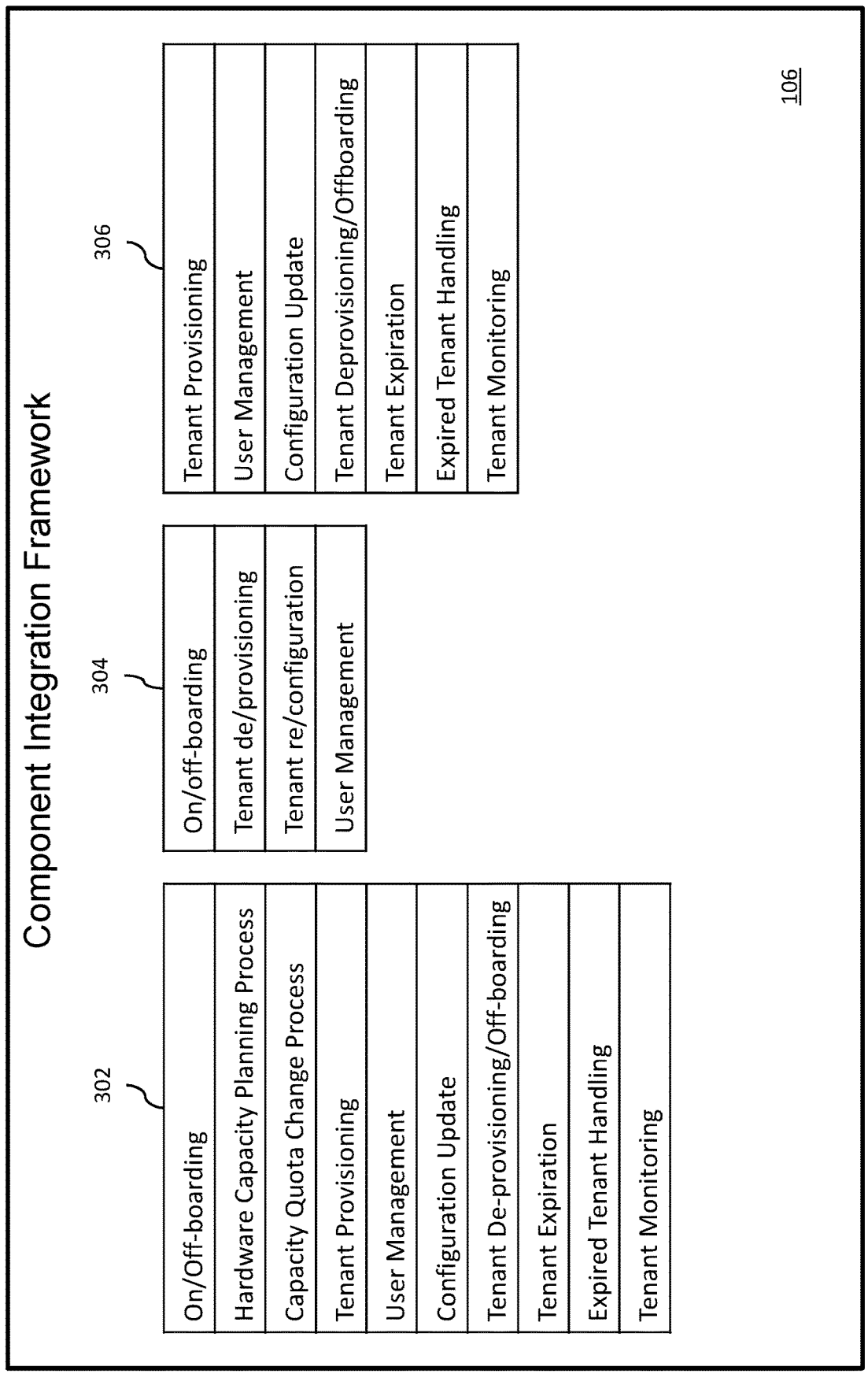
FIG. 3 illustrates exemplary processes executed in the integration framework shown in FIG. 1, according to some implementations of the current subject matter.

In some exemplary, non-limiting implementations, the OEM components provided to the integration framework 106 may be executing various OEM processes 302 (as shown in FIG. 3) that may require specific integration into the framework 106. Such OEM processes may include at least one of the following: on/off-boarding, hardware capacity planning process, capacity quota change process, tenant provisioning, user management, configuration update, tenant de-provisioning/off-boarding, tenant expiration, expired tenant handling, tenant monitoring, and/or any combination thereof. In some implementations, to ensure proper integration of OEM component(s), the integration framework may provide one or more integration management application programming interfaces (APIs) 304, as shown in FIG. 3. Such API may include one or more of the following: OEM on/off-boarding, tenant de/provisioning, tenant re/configuration, user management APIs, and/or any combination thereof. In some implementations, the APIs may be specifically generated to accommodate particular aspects of the OEM products and/or any other tenants (e.g., components, systems, etc.) that may use and/or may be incorporated into the integration framework. The APIs may provide full end-to-end process support in order to ensure proper embedding of cloud OEM into the integration framework.

In some exemplary implementations, OEM processes identified above may have specific pre-requisites 306, as shown in FIG. 3 that define particular aspects of embedding of the OEM processes and integration framework. For example, some pre-requisites of OEM on/off-boarding processes may relate to various aspects of planning and hardware estimation, quota management, customer entitlement, tenant creation, customer experience, customer support, maintenance windows, outage communication, change management, internal cross charging, licensing, exceptions, access, termination, and/or any other aspects, and/or any combination thereof. The OEM hardware capacity planning process may include determination of consumption of computing resources of the integration framework. The OEM capacity quota change process may relate to a technical representation of the overall reserved hardware capacity for an OEM component at the integration framework, which may be a guaranteed consumable quota of hardware resources that an OEM component may consume within a particular timeframe. The parameter may depend on a number of user, number of tenants at the integration framework, and/or any other usage parameters.

In some implementations, once the OEM component has been on-boarded, the OEM may start managing various tenants of the integration framework. Management of tenants may include OEM component tenant provisioning, OEM component user management, OEM component configuration update, OEM component tenant de-provisioning/off-boarding, OEM component tenant expiration, OEM component expired tenant handling, and OEM component tenant monitoring, and/or any other processes, and/or any combination thereof.

In some implementations, the tenant management system 114 may be configured to manage the above APIs. The tenant management APIs may be incorporated into a service layer which may create and/or manage tenants (e.g., data centers, availability zones, etc.). Any API calls may be secured using API keys which may be OEM component-specific and which may be re/generated by the OEMs. The OEM may also provide any requisite authentication, security, etc. to the tenants, components, etc.

In some implementations, as stated above, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 4:
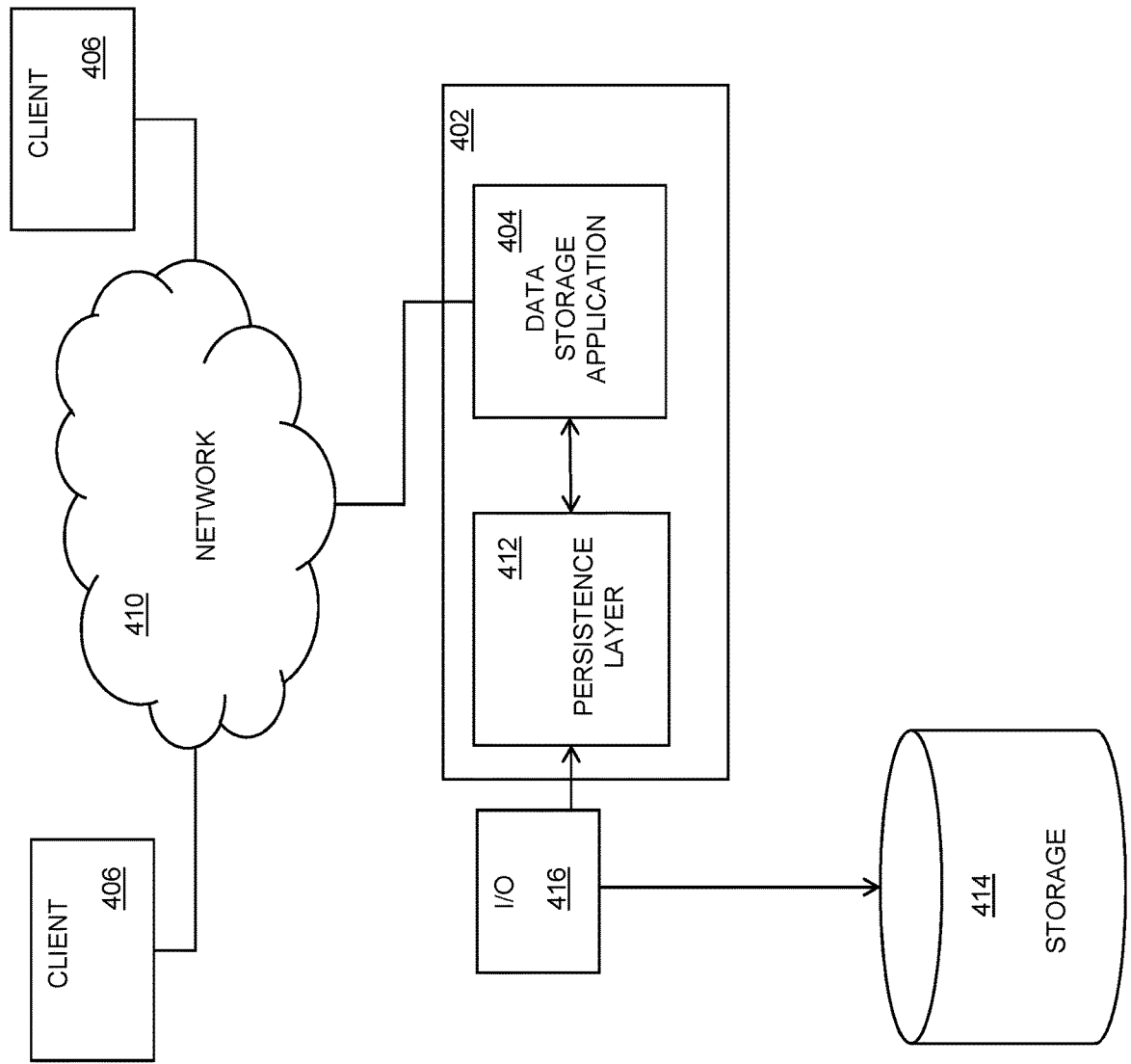
FIG. 4 is a diagram illustrating an exemplary system including a data storage application, according to some implementations of the current subject matter.

FIG. 4 illustrates an exemplary system 400 in which a computing system 402, which can include one or more programmable processors that can be collocated, linked over one or more networks, etc., executes one or more modules, software components, or the like of a data storage application 404, according to some implementations of the current subject matter. The data storage application 404 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 5:
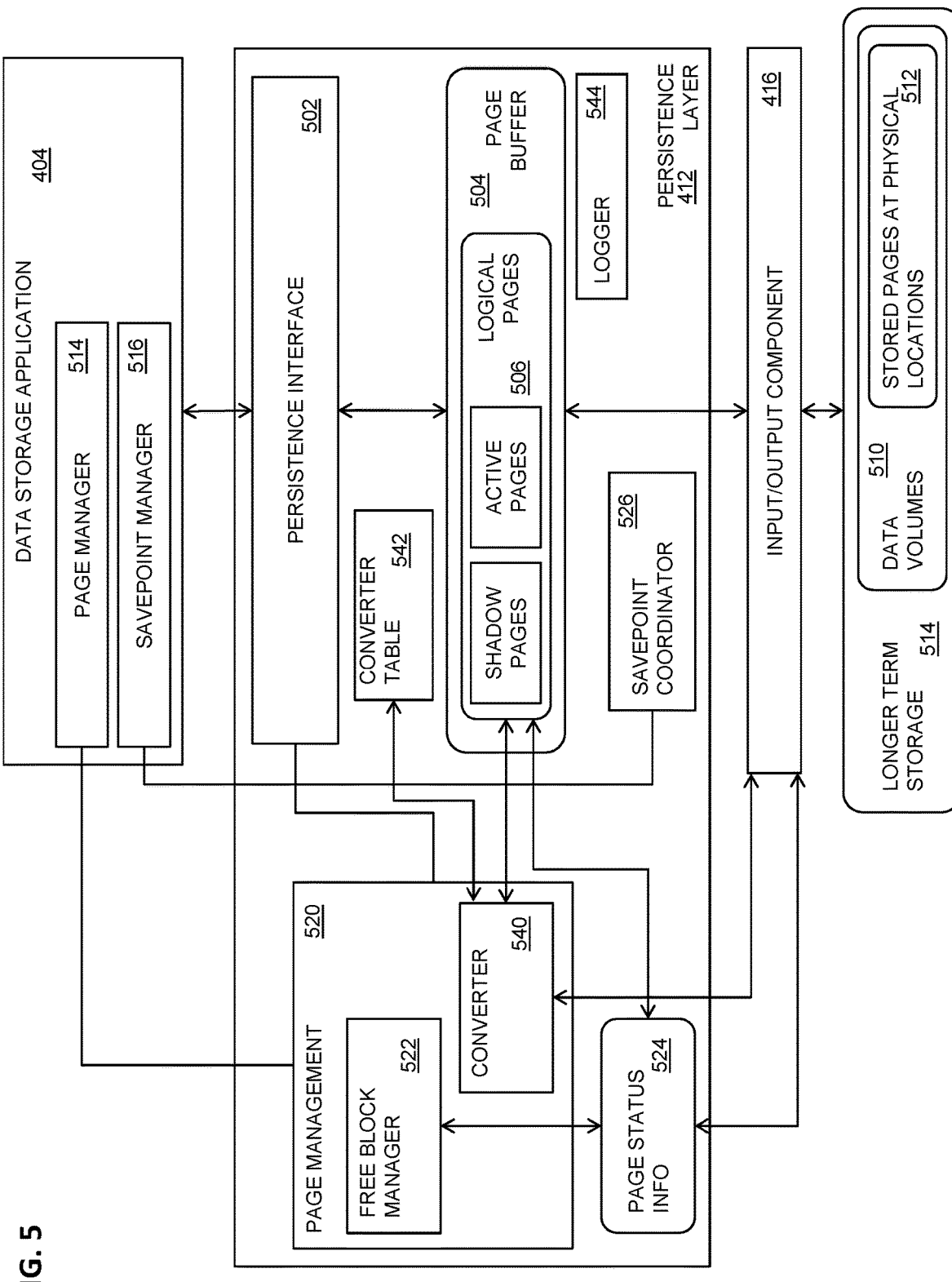
FIG. 5 is a diagram illustrating details of the system of FIG. 4.

FIG. 5 illustrates exemplary software architecture 500, according to some implementations of the current subject matter. A data storage application 404, which can be implemented in one or more of hardware and software, can include one or more of a database application, a network-attached storage system, or the like. According to at least some implementations of the current subject matter, such a data storage application 404 can include or otherwise interface with a persistence layer 412 or other type of memory buffer, for example via a persistence interface 502. A page buffer 504 within the persistence layer 412 can store one or more logical pages 506, and optionally can include shadow pages, active pages, and the like. The logical pages 506 retained in the persistence layer 412 can be written to a storage (e.g. a longer term storage, etc.) 414 via an input/output component 416, which can be a software module, a sub-system implemented in one or more of software and hardware, or the like. The storage 414 can include one or more data volumes 510 where stored pages 512 are allocated at physical memory blocks.

In some implementations, the data storage application 404 can include or be otherwise in communication with a page manager 514 and/or a savepoint manager 516. The page manager 514 can communicate with a page management module 520 at the persistence layer 412 that can include a free block manager 522 that monitors page status information 524, for example the status of physical pages within the storage 414 and logical pages in the persistence layer 412 (and optionally in the page buffer 504). The savepoint manager 516 can communicate with a savepoint coordinator 526 at the persistence layer 412 to handle savepoints, which are used to create a consistent persistent state of the database for restart after a possible crash.

In some implementations of a data storage application 404, the page management module of the persistence layer 412 can implement a shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 414. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 414, the storage page to be loaded can be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 can ensure that changes made in the data storage application 404 are durable and that the data storage application 404 can be restored to a most recent committed state after a restart. Writing data to the storage 414 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 can also be included to store the changes made to the data of the data storage application in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 412 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Thereafter, the logger 544 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 404 can use shadow paging so that the savepoint manager 516 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 6:
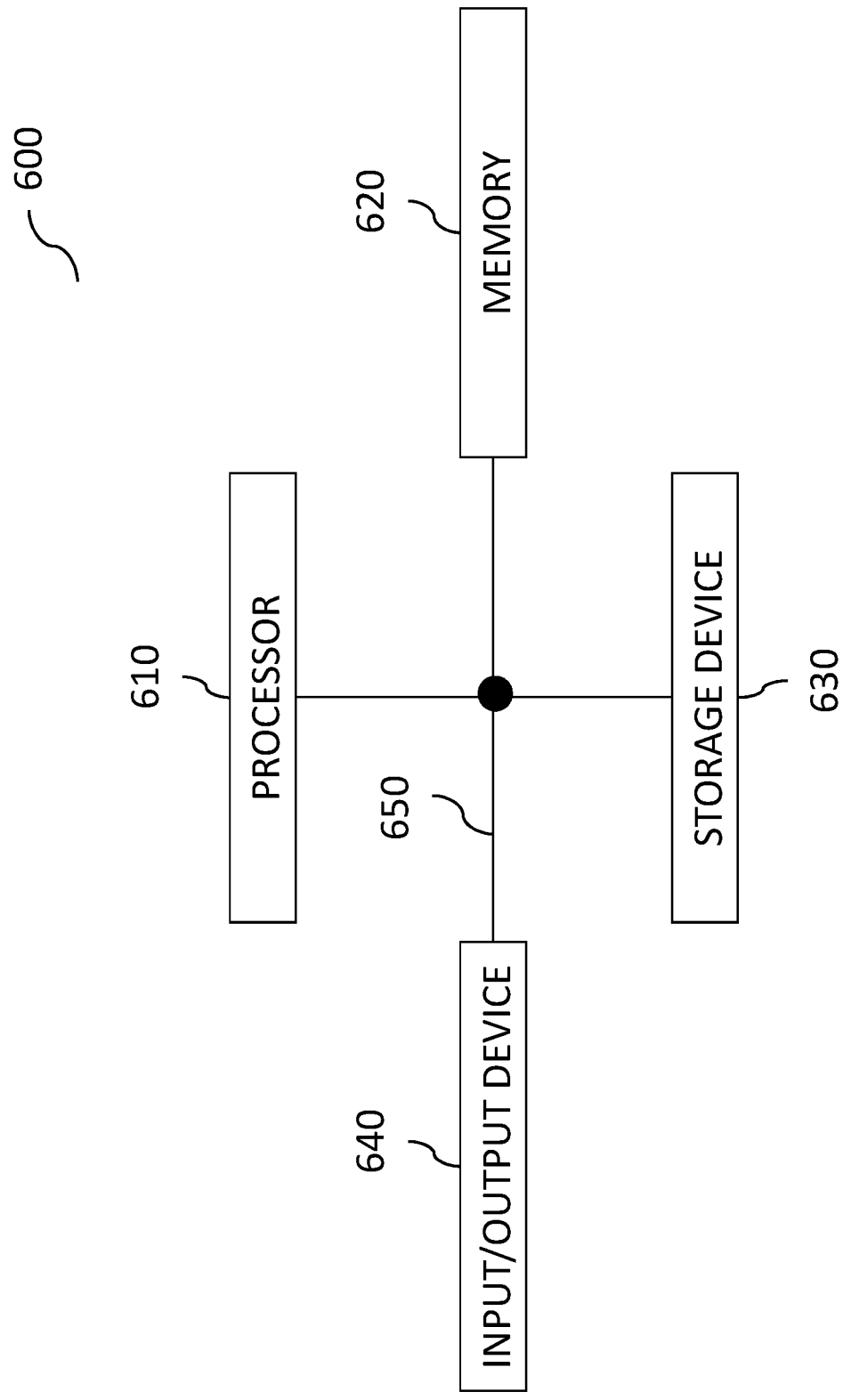
FIG. 6 illustrates an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

FIG. 7 illustrates an exemplary method 700 for performing component integration, according to some implementations of the current subject matter. At 702, a first computing system (e.g., OEM system 102) may generate a computing component (e.g., a software application, system, etc.) for integration with a second computing system (e.g., framework 106, such as, for example, SAP Analytics Cloud system, available from SAP SE, Walldorf, Germany). At 704, the first computing system may provide the computing component to the second computing system. At 706, the second computing system may configure the computing component for operation by the first computing system with at least one computing component (e.g., a tenant component of the framework 106) of the second computing system. At 708, the first computing system may operate the configured computing component in the second computing system.

In some implementations, the current subject matter may include one or more of the following optional features. The method may include monitoring, by the first computing system, operation of the configured computing component in the second computing system.

In some implementations, the configured computing component may include a software application, a hardware component, and any combination thereof. At least one of the first computing system and the second computing system is a cloud computing system.

In some implementations, the second computing system may provide at least one application programming interface for execution of at least one management process of the configured computing component and the at least one computing component of the second computing system. The management process may include at least one of the following: component provisioning, user management, configuration update, component de-provisioning, component off-boarding, expiration of the component, monitoring of the component de-provisioning, and any combination thereof.

In some implementations, the method may include embedding at least one user interface of the second computing system into at least one user interface of the first computing system associated with the configured computing component.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method, comprising:
generating, by a first computing system, a computing component for integration with a second computing system, the first computing system being separate from and is communicatively coupled to the second computing system;
providing, by the first computing system, the computing component to the second computing system;
configuring, by the second computing system, the computing component for operation by the first computing system with at least one computing component of the second computing system, wherein the second computing system generates at least one application programming interface for integrating and synchronizing the configured computing component with the at least one computing component of the second computing system; and
operating, by the first computing system, the configured computing component in the second computing system, wherein one or more application programming interface keys specific to the first computing system secure operation calls to the configured to computing component.

2. The method according to claim 1, further comprising monitoring, by the first computing system, operation of the configured computing component in the second computing system.

3. The method according to claim 1, wherein the configured computing component includes a software application, a hardware component, and any combination thereof.

4. The method according to claim 1, wherein at least one of the first computing system and the second computing system is a cloud computing system.

5. The method according to claim 1, wherein the second computing system provides at least one application programming interface for execution of at least one management process of the configured computing component and the at least one computing component of the second computing system;
wherein the at least one management process includes at least one of the following: the at least one computing component provisioning, user management, configuration update, the at least one computing component de-provisioning, the at least one computing component off-boarding, expiration of the at least one computing component, monitoring of the at least one computing component de-provisioning, and any combination thereof.

6. The method according to claim 1, further comprising embedding at least one user interface of the second computing system into at least one user interface of the first computing system associated with the configured computing component.

7. A system comprising:
at least one programmable processor; and
a non-transitory machine-readable medium storing instructions that, when executed by the at least one programmable processor, cause the at least one programmable processor to perform operations comprising:
generating, by a first computing system, a computing component for integration with a second computing system, the first computing system being separate from and is communicatively coupled to the second computing system;
providing, by the first computing system, the computing component to the second computing system;
configuring, by the second computing system, the computing component for operation by the first computing system with at least one computing component of the second computing system, wherein the second computing system generates at least one application programming interface for integrating and synchronizing the configured computing component with the at least one computing component of the second computing system; and operating, by the first computing system, the configured computing component in the second computing system, wherein one or more application programming interface keys specific to the first computing system secure operation calls to the configured to computing component.

8. The system according to claim 7, wherein the operations further comprise monitoring, by the first computing system, operation of the configured computing component in the second computing system.

9. The system according to claim 7, wherein the configured computing component includes a software application, a hardware component, and any combination thereof.

10. The system according to claim 7, wherein at least one of the first computing system and the second computing system is a cloud computing system.

11. The system according to claim 7, wherein the second computing system provides at least one application programming interface for execution of at least one management process of the configured computing component and the at least one computing component of the second computing system;

wherein the at least one management process includes at least one of the following: the at least one computing component provisioning, user management, configuration update, the at least one computing component de-provisioning, the at least one computing component off-boarding, expiration of the at least one computing component, monitoring of the at least one computing component de-provisioning, and any combination thereof.

12. The system according to claim 7, wherein the operations further comprise embedding at least one user interface of the second computing system into at least one user interface of the first computing system associated with the configured computing component.

13. A computer program product comprising a non-transitory machine-readable medium storing instructions that, when executed by at least one programmable processor, cause the at least one programmable processor to perform operations comprising:

generating, by a first computing system, a computing component for integration with a second computing system, the first computing system being separate from and is communicatively coupled to the second computing system;

providing, by the first computing system, the computing component to the second computing system;

configuring, by the second computing system, the computing component for operation by the first computing system with at least one computing component of the second computing system, wherein the second computing system generates at least one application programming interface for integrating and synchronizing the configured computing component with the at least one computing component of the second computing system; and operating, by the first computing system, the configured computing component in the second computing system, wherein one or more application programming interface keys specific to the first computing system secure operation calls to the configured to computing component.

14. The computer program product according to claim 13, wherein the operations further comprise monitoring, by the first computing system, operation of the configured computing component in the second computing system.

15. The computer program product according to claim 13, wherein the configured computing component includes a software application, a hardware component, and any combination thereof.

16. The computer program product according to claim 13, wherein at least one of the first computing system and the second computing system is a cloud computing system.

17. The computer program product according to claim 13, wherein the second computing system provides at least one application programming interface for execution of at least one management process of the configured computing component and the at least one computing component of the second computing system;

wherein the at least one management process includes at least one of the following: the at least one computing component provisioning, user management, configuration update, the at least one computing component de-provisioning, the at least one computing component off-boarding, expiration of the at least one computing component, monitoring of the at least one computing component de-provisioning, and any combination thereof.

18. The computer program product according to claim 13, wherein the operations further comprise embedding at least one user interface of the second computing system into at least one user interface of the first computing system associated with the configured computing component.

* * * * *